United States Patent [19]

Herb

[11] Patent Number: 4,886,406

[45] Date of Patent: Dec. 12, 1989

[54] ANCHOR BOLT AND EXPANSION WEDGE

[75] Inventor: Armin Herb, Peissenberg, Fed. Rep. of Germany

[73] Assignee: Hilti Aktiengesellschaft, Fürstentum, Liechtenstein

[21] Appl. No.: 186,899

[22] Filed: Apr. 27, 1988

[30] Foreign Application Priority Data

Apr. 27, 1987 [DE] Fed. Rep. of Germany ....... 3714008

[51] Int. Cl.$^4$ ............................................. F16B 13/04
[52] U.S. Cl. ........................................ 411/78; 411/79; 411/923
[58] Field of Search .................................. 411/78–80, 411/447, 448, 485, 486, 922, 923

[56] References Cited

U.S. PATENT DOCUMENTS

| 4,275,637 | 6/1981 | Herb et al. | 411/78 |
| 4,312,611 | 1/1982 | Herb | 411/79 X |
| 4,312,615 | 1/1982 | Herb | 411/78 |
| 4,427,327 | 1/1984 | Herb | 411/78 |

FOREIGN PATENT DOCUMENTS

| 2905337 | 8/1980 | Fed. Rep. of Germany | 411/75 |
| 8534738 | 4/1986 | Fed. Rep. of Germany | . |
| 3520730 | 12/1986 | Fed. Rep. of Germany | . |

Primary Examiner—Gary L. Smith
Assistant Examiner—Douglas E. Ringel
Attorney, Agent, or Firm—Toren, McGeady & Associates

[57] ABSTRACT

An anchor member assembly is made up of an anchor bolt and an expansion wedge. The assembly can be anchored in a borehole in a receiving material by inserting the assembly and then displacing the expansion wedge relative to a wedge surface on the anchor bolt. At its trailing end, the anchor bolt has an axially extending outwardly flaring head section forming at least a part of a conical surface. The head section can be driven by hammer blows into a wooden member. Initially, the anchor bolt and expansion wedge are in detachable engagement until the head section is driven into the wooden member. Subsequently, as the expansion wedge is axially displaced relative to the anchor bolt, the engagement between them is released and the anchor member assembly is secured in the receiving material.

14 Claims, 4 Drawing Sheets

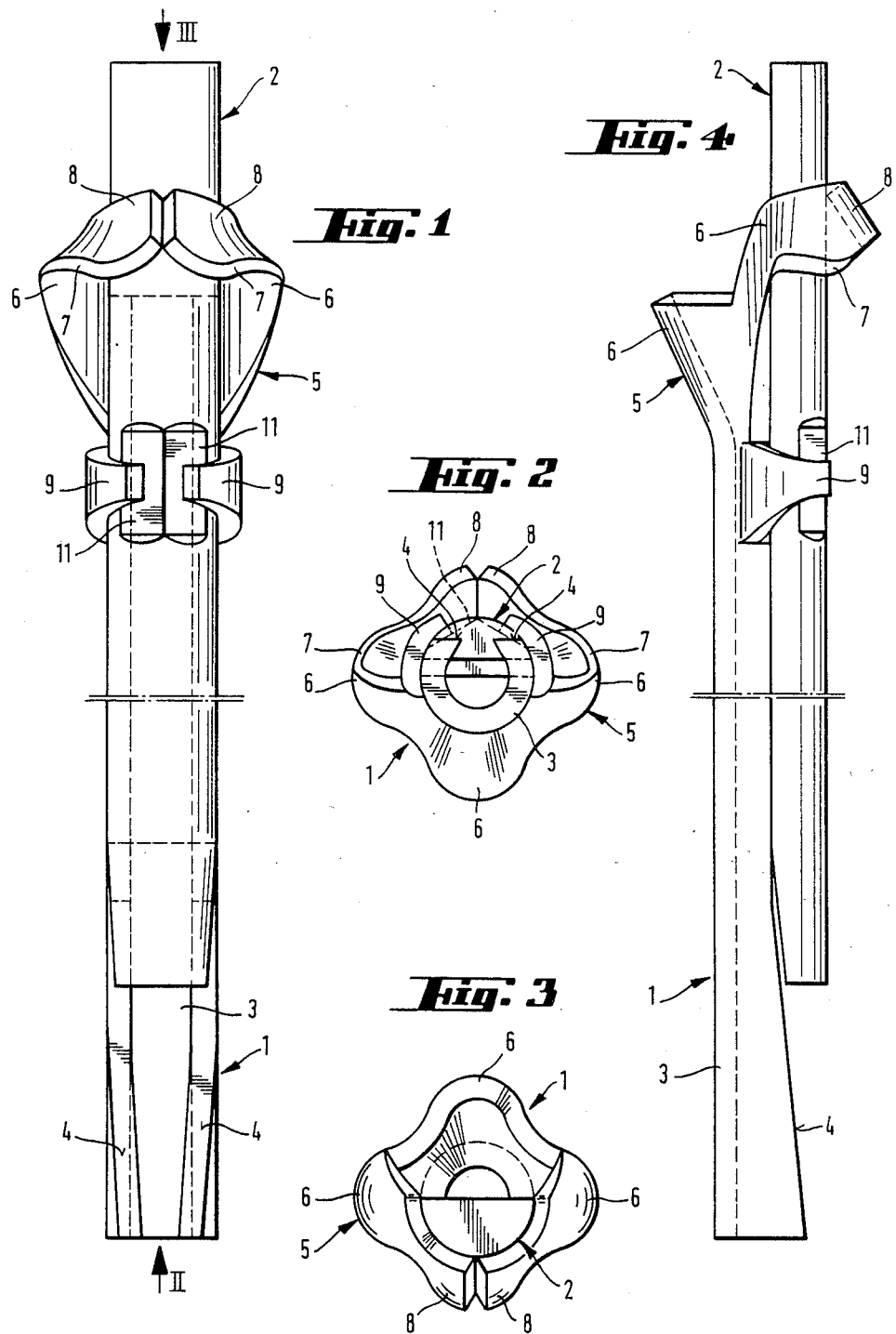

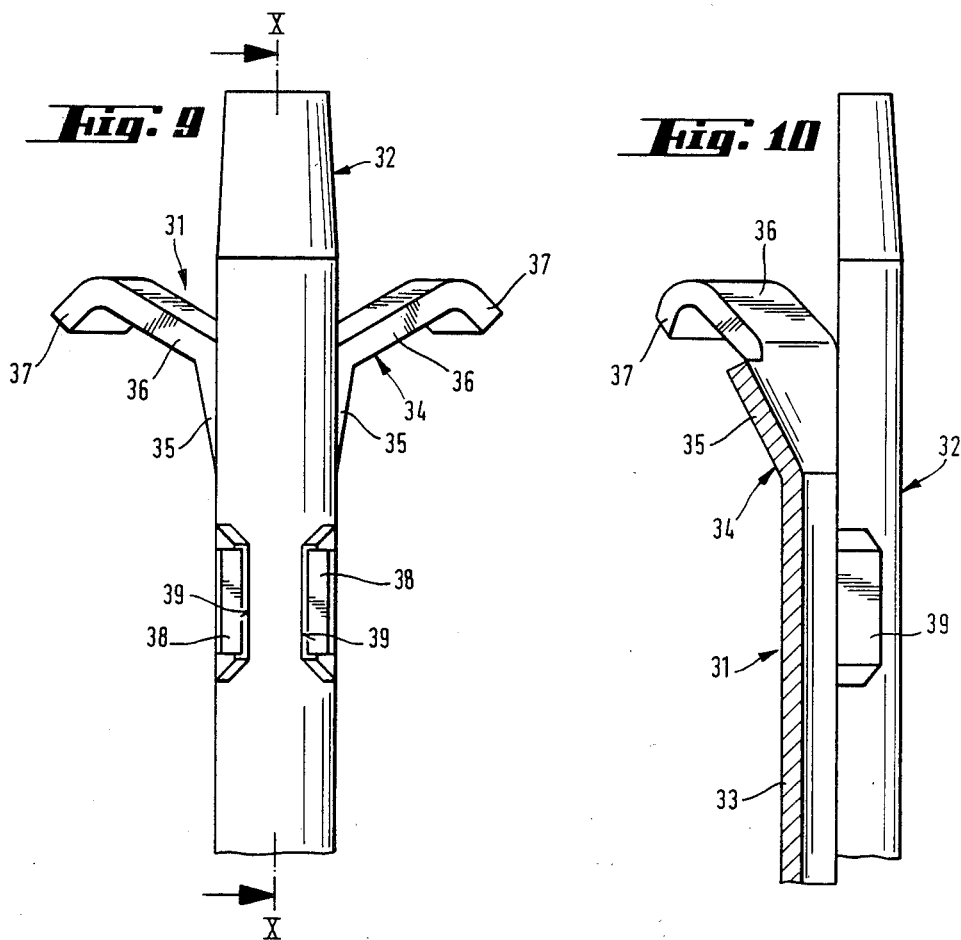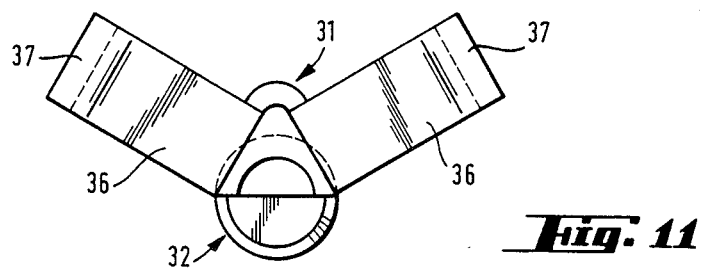

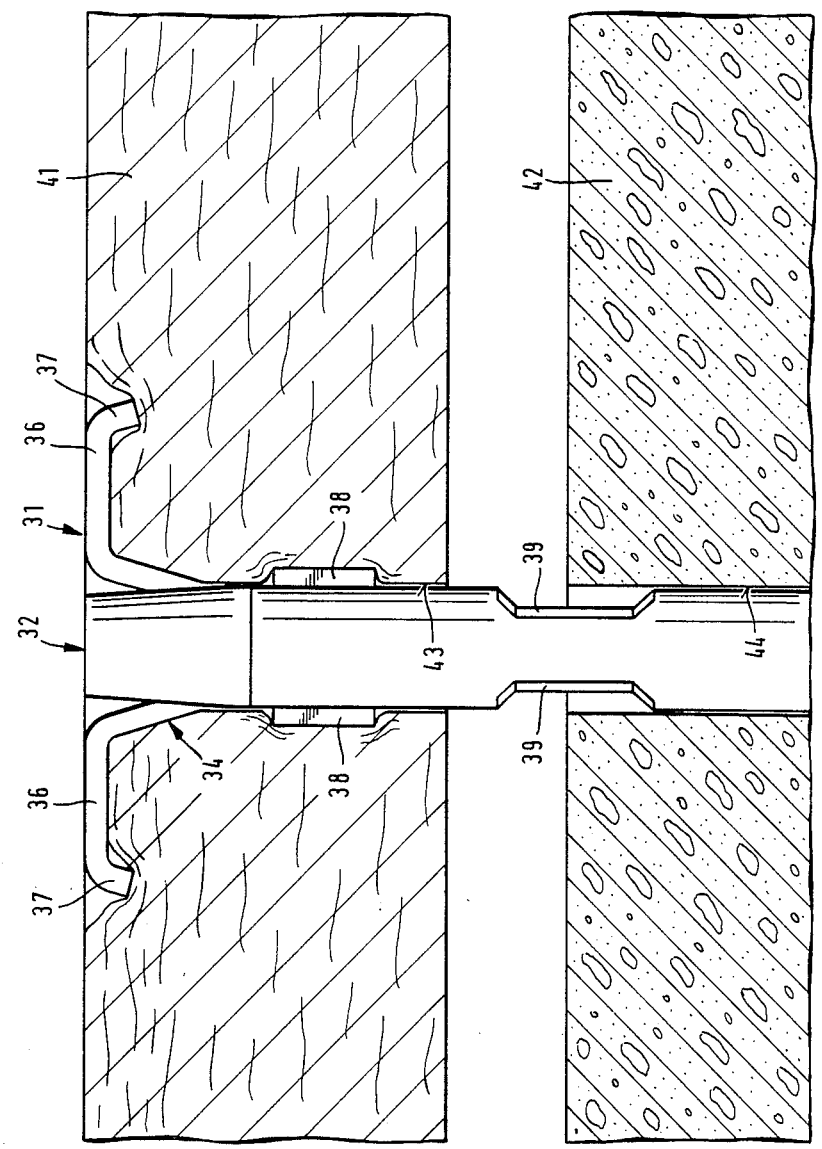

ANCHOR BOLT AND EXPANSION WEDGE

BACKGROUND OF THE INVENTION

The present invention is directed to an anchor member assembly made up of an anchor bolt and an expansion wedge with the anchor bolt having a head portion at its trailing end and a wedge surface at its leading end with the wedge surface inclined outwardly into the path of the expansion wedge.

The leading end of the expansion wedge is axially displaceable along the wedge surface on the anchor bolt for expanding the cross-section of the assembly after a detachable connection between the anchor bolt and the expansion wedge has been released. In the insertion condition, when the assembly is inserted into a receiving material, the trailing end of the expansion wedge is located rearwardly of the head portion at the trailing end of the anchor bolt.

In U. S. Pat. No. 4,275,637, an anchor assembly is disclosed made up of an anchor bolt and an expansion wedge. At its leading end, the anchor bolt has a wedge surface pointing in the insertion direction and at its trailing end a head portion projecting radially outwardly from the bolt. Before the assembly is expanded, the expansion wedge is detachably connected with the anchor bolt and projects rearwardly from it.

For securing objects to a receiving material where the attachment is effected inwardly from the surface of the receiving material, the anchor assembly is inserted through a bore in the object into a borehole in the receiving material so that the head at the trailing end of the assembly rests against the surface of the object and also protrudes axially from the surface. By applying axially directed force to the expansion wedge projecting rearwardly from the anchor bolt, the connection of the bolt with the wedge is released and an anchorage is achieved in the receiving material inwardly from its surface by the displacement of the expansion wedge along the wedge surface at the leading end of the anchor bolt.

SUMMARY OF THE INVENTION

Frequently, the head portion of the anchor bolt must be embedded in the object to be secured, such as in securing wooden members to a receiving material; accordingly, it is the primary object of the present invention to improve an anchor member assembly of the above type so that its head portion can be driven into the object.

In accordance with the present invention, the head portion is provided with a contour conically widening in the trailing end direction of the anchor bolt and with the head portion extending around at least a circumferential portion of the anchor bolt periphery.

A head portion with a configuration widening in a conical manner is capable of penetrating into an object to be fastened while displacing material within the object. Inward movement of the head portion is opposed by an increasing penetration resistance.

In placing the anchor member assembly, it is inserted into the borehole in the receiving material until the head portion rests against the object to be secured to the receiving material. A force is directed in the insertion direction against the expansion wedge, so that the wedge along with the anchor bolt moves further into the borehole. During such movement, the head portion enters into the object. Towards the end of this inward movement of the head portion, the penetration resistance exceeds the holding force of the connection between the expansion wedge and the anchor bolt and the connection is released. When further force is directed against the expansion wedge, the wedge moves deeper into the borehole with relative axial displacement in respect to the anchor bolt and moves along the wedge surface of the bolt. Accordingly, the anchoring of the assembly is effected by expanding the leading end of the assembly within the receiving material.

In a preferred embodiment, the head portion is formed by radially extending ribs. The ribs extend outwardly from only a portion of the anchor bolt adjacent the head portion with the ribs spaced in the circumferential direction. Forming the head portion by means of ribs has advantages in production technology, particularly if the anchor dowel is fabricated from sheet metal. The functional advantage of the ribs is in their ability to cut into the object as the assembly is being driven in. As a result, there is only small penetration resistance so that the driving forces are kept small.

In one preferred arrangement, a support shoulder extending rearwardly in axial projection beyond the head portion is provided. The support shoulder moves into contact with the surface of the object at the end of the process of driving the head portion into the object, whereby the anchor member assembly is prevented in its entirety from further movement into the borehole. Application of additional axial force to the expansion wedge results in the release of the detachable engagement between the anchor bolt and the wedge and the axial movement of the wedge relative to the bolt to achieve the desired anchorage. The support shoulder acts as a stop independently of the strength of the material of the object being anchored. The retaining force of the detachable connection can be selected so that it is exceeded only after the stop effect has occurred. Such an arrangement permits larger tolerances in the form of the connection or engagement.

If the support shoulder projects outwardly from the surface of the object being secured after the anchorage of the anchor member assembly, then it can be embedded or driven into the surface of the object by several hammer blows. Accordingly, the support shoulder affords a considerable increase of the overtightening values whereby the object is secured against the receiving material, not only by the head portion but also by the support shoulder. Preferably, the support shoulder projects beyond the head portion in the circumferential direction. As a result, there is a small stop surface so that the shoulder can be embedded into relatively hard objects. In the case of soft objects, it is expedient to provide a larger stop surface with the support shoulder projecting radially outwardly from the head portion.

In another embodiment of the invention, the support shoulder is formed as a flange, at least partially engaging the expansion wedge in the circumferential direction. Therefore, the flange serves not only for radial guidance of the expansion wedge before and during the anchoring procedure, but it also contributes to radial stiffening of the head portion. Moreover, the flange portion serves as a deformable bending point which facilitates embedding the support shoulder in the object.

In a desirable arrangement, the flange portion is shaped in a manner of a funnel extending away from the head portion. As a result, the flange is well suited for embedment in the object; however, it can also be redirected into a plane disposed at right angles to the axis of the anchor member assembly for engaging at the surface of the object in a planar manner. Furthermore, such an arrangement of the flange leads to a more pronounced radially outward offset of the support shoulder, which is especially advantageous when used in connection with very soft objects.

Another feature of the invention is the detachable engagement or connection between the anchor bolt and the expansion wedge by means of tabs on the anchor bolt extending in the circumferential direction and at least partially engaging corresponding recesses in the expansion wedge. If the retaining force of the connection developed by the engagement of the tabs in the recesses is exceeded, the tabs are moved radially into the wall of the bore in the object by the contour of the expansion wedge axially adjacent to the recesses, so that an axial securement of the object at the anchor bolt is achieved. In this manner, the object can be located at any distance from the surface of the receiving material without the use of spacer shims and secured by the anchorage of the anchor member assembly.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described embodiments of the invention.

DESCRIPTION OF THE DRAWINGS

In the drawings:

FIG. 1 is an elevational view of an anchor member assembly in the insertion condition;

FIG. 2 is a bottom or leading end view of the anchor member assembly shown in FIG. 1, as viewed in the direction of the arrow II;

FIG. 3 is a top or trailing end view of the anchor member assembly, illustrated in FIG. 1, and viewed in the direction of the arrow III;

FIG. 4 is an elevational view, similar to FIG. 1, with the anchor member assembly turned through 90°;

FIG. 9 is a partial elevational view of the trailing end region of still another embodiment of the anchor member assembly displayed in the insertion condition;

FIG. 10 is an elevational view partly in section, of the anchor member assembly shown in FIG. 9, taken along the line X—X;

FIG. 11 is a plan or trailing end view of the anchor member assembly illustrated in FIG. 9; and FIG. 12 is an elevational view, partly in section, illustrating the anchor member assembly of FIG. 9, securing an object to a receiving material.

DETAILED DESCRIPTION OF THE INVENTION

Figure 5:
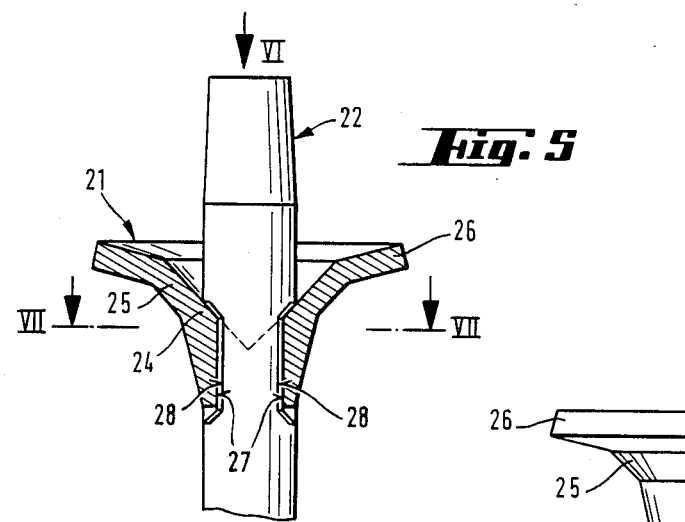
FIG. 5 is a partial elevational view, partly in section, of the trailing end region of another embodiment of the anchor member assembly illustrated in the insertion condition.

The anchor member assembly displayed in FIGS. 1–4 is made up of an axially elongated anchor member of bolt 1 and an axially elongated expansion wedge 2. As viewed in FIG. 1, the lower end of the anchor bolt 1 and of the expansion wedge 2, is the leading end and the upper end of each is the trailing end, in other words, the leading end is inserted first into a borehole into which the assembly is to be anchored. Anchor bolt 1 is a shaped sheet metal component with an axially extending shank section 3 having a two-part wedge surface 4 at the leading end of the shank section. Wedge surface 4 extends at an angle outwardly from the upper axially extending surface of the shank section 3, into the path of the leading end of the expansion wedge 2. When the anchor member assembly is inserted and then anchored, the expansion wedge 2 moves axially along the wedge surface 4 and is forced radially outwardly into anchored engagement with the receiving material into which the assembly is inserted. At its trailing end, the anchor bolt 1 has a head portion 5. Head portion 5 extends axially from the shank section 3, first extending radially away from the expansion wedge 2 and then forming two ribs 6 in spaced relation around the circumference of the anchor bolt with the ribs extending toward the expansion wedge 2. As can be seen in FIG. 3, the surfaces of the ribs 6 form a conically widening surface toward the trailing end of the anchor bolt.

Each of the ribs 6 extend toward a support shoulder 7 about the expansion wedge 2 at the trailing end of the head portion. The ends of the support shoulder 7, on the opposite side of the expansion wedge from the anchor bolt 1, each form a flange 8, partially embracing the circumferential surface of the expansion wedge 2, with the flanges 8 extending toward and into contact with one another, note FIGS. 1, 2 and 3.

Anchor bolt 1 is in detachable engagement with the expansion wedge 2. This engagement is afforded by tabs 9 formed from the anchor bolt and bent in the circumferential direction around the expansion wedge 2, into engagement with the axially extending recesses 11 in the surface of the expansion wedge.

Figure 8:
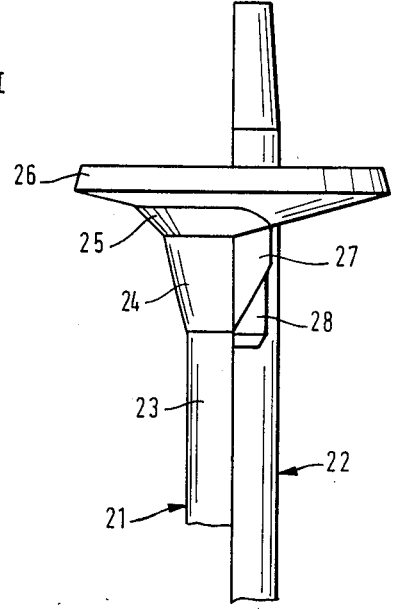
FIG. 8 is an elevational view of the anchor member assembly shown in FIG. 5, turned through 90°.
Figure 6:
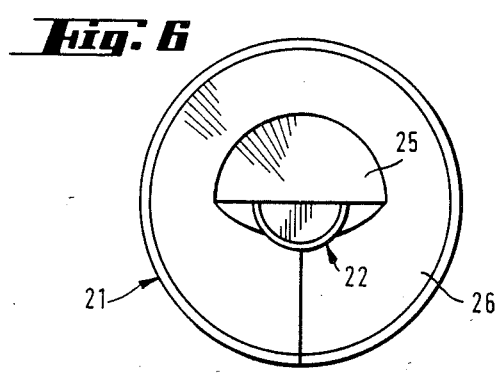
FIG. 6 is a plan or trailing end view of the anchor member assembly displaced in FIG. 5, viewed in the direction of the arrow VI.
Figure 7:
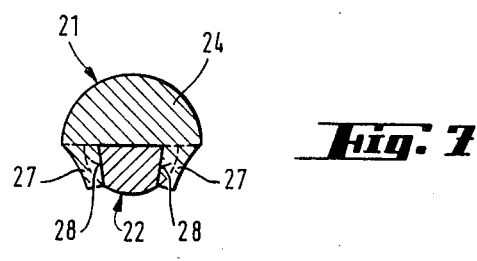
FIG. 7 is a cross-sectional view of the anchor member assembly depicted in FIG. 5, taken along the line VII—VII.

In FIGS. 5 to 8, another anchor member assembly embodying the present invention is displayed formed by an axially elongated anchor bolt 21 and an axially elongated expansion wedge 22. Only the trailing end portions of the assembly are shown since the leading end portion are similar to the embodiment of FIGS. 1 to 4. Anchor bolt 21 has a head portion 24 at its trailing end in the form of a conically widening surface extending from the shank section 23 of the bolt. Initially, the head portion 24 extends axially from the shank section 23, with its outer surface shaped conically and then extending into a flange 25, note FIGS. 5, 6 and 8, extending axially and radially outwardly to a support shoulder 26 projecting slightly axially and radially outwardly from the flange 25 with the shoulder 26 spaced radially outwardly from the shank section 23 and extending around or encircling the expansion wedge 22. Tabs 27 extend in the circumferential direction from the head portion 24 and engage in recesses 28 of the expansion wedge 22 for forming the detachable engagement between the anchor bolt and the engagement wedge.

In still another embodiment of the present invention, as displayed in FIGS. 9 to 12, the anchor member assembly is made up of an axially elongated anchor bolt 31 and an axially elongated expansion wedge 32. The leading end portions of the anchor bolt 31 and the expansion wedge 32 are similar to the anchor member assembly illustrated in FIGS. 1 and 4. At its trailing end, the anchor bolt 31 has a head portion 34 extending axially upwardly and radially outwardly from the shank section 33 of the anchor bolt. The head portion 34 forms a portion of a conically-shaped surface and includes a pair of ribs 35 projecting upwardly and outwardly from the trailing end of the shank section 33. Each of the upper ends, as viewed in FIGS. 9 and 10, of the ribs 35 are integral with a flange part 36, projecting upwardly and radially outwardly from the ribs. Generally speaking, the flange parts 36 extend transversely of the axial direction of the shank section 33. Each flange part 36 has a shoulder 37 at its radially outer end with the shoulders 37 bent downwardly. Tabs 38 are formed from the sheet metal making up the anchor bolt with the tabs extending generally circumferentially toward and into surface contact with the recesses 39 formed in the surface of the expansion wedge 32. The tabs 38 and the recesses 39 form the detachable engagement between the anchor bolt and the expansion wedge.

In FIG. 12, the anchor member assembly of FIGS. 9 to 11 is shown securing a wooden member 41 to a receiving material 42 with a selectable distance formed between the facing surfaces of the wooden member and the receiving material. The selectable distance between the two surfaces can be adjusted.

Wooden member 41 is provided with a borehole 43 and the receiving material 42 with an aligned borehole 44, with the boreholes in alignment and arranged for the insertion of the anchor member assembly in the insertion condition. After the anchor member assembly is inserted into the aligned boreholes 43, 44, hammer blows are directed against the trailing end of the expansion wedge 32 until the head portion 34 runs up against the opening to the borehole 43. Since the expansion wedge 32 is detachably connected to the anchor bolt 31 by the tabs 38, during the inward force directed against the assembly, there is a common insertion of the assembly into the borehole 44 and the tabs 38 dig into the wooden member 41 displacing some of the material of the wooden member as shown in FIG. 12. With the tabs embedded into the wooden member 41, the head portion 34 with the support shoulders 37 contact the outer surface of the wooden member 41. This contact prevents any further displacement of the anchor bolt 31 into the borehole 44 and any additional blows or force cause a separation of the tabs 38 out of the recesses 39 with the expansion wedge 32 moving axially relative to the anchor bolt 31. With the movement of the expansion wedge 32 relative to the anchor bolt 31, the tabs 38 are pressed radially outwardly into the surface of the borehole 43 in the wooden member 41 and provide an axial fixing of the anchor bolt relative to the wooden member. The desired spacing between the wooden member 41 and the receiving material 42 can be adjusted by a possible axial displacement of the anchor dowel 31. As the expansion wedge 32 is driven axially relative to the anchor bolt 31, the wedge surface at its leading end contacts the corresponding wedge surface at the leading end of the shank section 33, and in a known manner, the anchor member assembly is anchored within the receiving material 42. Any possible projection of the flange portions 36 or the support shoulder 37 can be eliminated by driving these parts by hammer blows into the surface of the wooden member 41 with the flange portion serving as a bending location.

The other embodiments of the anchor member assembly can be installed in the same manner.

While specific embodiments of the invention have been shown and described in detail to illustrate the application of the inventive principles, it will be understood that the invention may be embodied otherwise without departing from such principles.

I claim:

1. Anchor member assembly comprising an axially elongated anchor bolt and an axially elongated expansion wedge, each of said anchor bolt and expansion wedge has a leading end and a trailing end relative to the insertion direction of the assembly into a borehole in a receiving material, said anchor assembly having an insertion condition and an expansion condition, said anchor bolt and expansion wedge being in detachable engagement in the insertion condition and the detachable engagement being released and said anchor bolt and expansion wedge being in relative axial displacement in the expansion condition, said anchor bolt has an axially extending head section at the trailing end thereof and an axially extending first wedge surface at the leading end thereof with an axially extending first shank section located therebetween, in the insertion condition said first shank section having an axially extending surface facing and in contact with said expansion wedge, said first wedge surface sloping angularly outwardly from said surface of said first shank section, said expansion wedge has an axially extending second shank section extending from the trailing end thereof toward the leading end in contact with the surface of said first shank section, and an axially extending second wedge surface adjacent the leading end thereof and extending axially from said second shank section, said second wedge surface arranged to contact and to be axially displaced relative to said first shank surface as said anchor member assembly is moved into the expansion condition after releasing the detachable engagement of said anchor bolt and expansion wedge in the insertion condition, in the insertion condition the trailing end of said expansion wedge projects axially outwardly from the trailing end of said anchor bolt, wherein the improvement comprises that said first shank section has a circumferentially extending outer peripheral edge at the trailing end thereof, said head section widens outwardly in the axial direction along a circumferential part of said outer peripheral edge of said first shank section toward the trailing end of said anchor bolt with said head section forming a part of a conically-shaped surface, said head section has at least one support shoulder located at the trailing end of said head section and spaced radially outwardly from the outer peripheral edge of said first shank section, and a flange section extends from a part of said head section extending from said outer peripheral edge and into said support shoulder, said head section comprises a pair of ribs spaced apart in the circumferential direction and extending from said outer peripheral edge and toward said at least one support shoulder, said ribs forming a part of the conically-shaped surface.

2. Anchor member assembly comprising an axially elongated anchor bolt and an axially elongated expansion wedge, each of said anchor bolt and expansion wedge has a leading end and a trailing end relative to the insertion direction of the assembly into a borehole in a receiving material, said anchor assembly having an insertion condition and an expansion condition, said anchor bolt and expansion wedge being in detachable engagement in the insertion condition and the detachable engagement being released and said anchor bolt and expansion wedge being in relative axial displacement in the expansion condition, said anchor bolt has an axially extending head section at the trailing end thereof and an axially extending first wedge surface at the leading end thereof with an axially extending first shank section located therebetween, in the insertion condition said first shank section having an axially extending surface facing and in contact with said expansion wedge, said first wedge surface sloping angularly outwardly from said surface of said first shank section, said expansion wedge has an axially extending second shank section extending from the trailing end thereof toward the leading end in contact with the surface of said first shank section, and an axially extending second wedge surface adjacent the leading end thereof and extending axially from said second shank section, said second wedge surface arranged to contact and to be axially displaced relative to said first shank surface as said anchor member assembly is moved into the expansion condition after releasing the detachable engagement of said anchor bolt and expansion wedge in the insertion condition, in the insertion condition the trailing end of said expansion wedge projects axially outwardly from the trailing end of said anchor bolt, wherein the improvement comprises that said first shank section has a circumferentially extending outer peripheral edge at the trailing end thereof, said head section widens outwardly in the axial direction along a circumferential part of said outer peripheral edge of said first shank section toward the trailing end of said anchor bolt with said head section forming a part of a conically-shaped surface, said head section has at least one support shoulder located at the trailing end of said head section and spaced radially outwardly from the outer peripheral edge of said first shank section, said support shoulder extends in the circumferential direction and projects from a part of said head section spaced axially from the outer peripheral edge of said first shank section, and a flange section extends from the part of said head section extending from said outer peripheral edge and into said support shoulder, said head section comprises a pair of ribs spaced apart in the circumferential direction and extending from said outer peripheral edge and toward said at least one support shoulder, said ribs forming a part of the conically-shaped surface.

3. Anchor member assembly comprising an axially elongated anchor bolt and an axially elongated expansion wedge, each of said anchor bolt and expansion wedge has a leading end and a trailing end relative to the insertion direction of the assembly into a borehole in a receiving material, said anchor assembly having an insertion condition and an expansion condition, said anchor bolt and expansion wedge being in detachable engagement in the insertion condition and the detachable engagement being released and said anchor bolt and expansion wedge being in relative axial displacement in the expansion condition, said anchor bolt has an axially extending head section at the trailing end thereof and an axially extending first wedge surface at the leading end thereof with an axially extending first shank section located therebetween, in the insertion condition said first shank section having an axially extending surface facing and in contact with said expansion wedge, said first wedge surface sloping angularly outwardly from said surface of said first shank section, said expansion wedge has an axially extending second shank section extending from the trailing end thereof toward the leading end in contact with the surface of said first shank section, and an axially extending second wedge surface adjacent the leading end thereof and extending axially from said second shank section, said second wedge surface arranged to contact and to be axially displaced relative to said first shank surface as said anchor member assembly is moved into the expansion condition after releasing the detachable engagement of said anchor bolt and expansion wedge in the insertion condition, in the insertion condition the trailing end of said expansion wedge projects axially outwardly from the trailing end of said anchor bolt, wherein the improvement comprises that said first shank section has a circumferentially extending outer peripheral edge at the trailing end thereof, said head section widens outwardly in the axial direction along a circumferential part of said outer peripheral edge of said first shank section toward the trailing end of said anchor bolt with said head section forming a part of a conically-shaped surface, said head section has at least one support shoulder located at the trailing end of said head section and spaced radially outwardly from the outer peripheral edge of said first shank section, said support shoulder projects radially outwardly from a part of said head section spaced axially said outer peripheral edge of said first shank section, and a flange section extends from the part of said head section extending from said outer peripheral edge and into said support shoulder, said head section comprises a pair of ribs spaced apart in the circumferential direction and extending from said outer peripheral edge and toward said at least one support shoulder, said ribs forming a part of the conically-shaped surface.

4. Anchor member assembly, as set forth in claim 2, wherein said flange section is funnel shaped extending outwardly toward the trailing end of said anchor bolt.

5. Anchor member assembly, as set forth in claim 3, wherein said flange section is funnel shaped extending outwardly toward the trailing end of said anchor bolt.

6. Anchor member assembly, as set forth in claim 1, wherein the detachable engagement between said anchor bolt and said expansion wedge comprises tabs extending circumferentially outwardly from said first shank section of said anchor bolt adjacent said head section and in contacting engagement with recesses formed in the second shank section of said expansion wedge.

7. Anchor member assembly, as set forth in claim 2, wherein the detachable engagement between said anchor bolt and said expansion wedge comprises tabs extending circumferentially outwardly from said first shank section of said anchor bolt adjacent said head section and in contacting engagement with recesses formed in the second shank section of said expansion edge.

8. Anchor member assembly, as set forth in claim 3, wherein the detachable engagement between said anchor bolt and said expansion wedge comprises tabs extending circumferentially outwardly from said first shank section of said anchor bolt adjacent said head section and in contacting engagement with recesses formed in the second shank section of said expansion edge.

9. Anchor member assembly, as set forth in claim 1, wherein said ribs are spaced outwardly and axially from said outer peripheral edge, and each said rib is connected to a separate part of said flange section.

10. Anchor member assembly, as set forth in claim 2, wherein said ribs are spaced outwardly and axially from said outer peripheral edge, and each said rib is connected to a separate part of said flange section.

11. Anchor member assembly, as set forth in claim 3, wherein said ribs are spaced outwardly and axially from said outer peripheral edge, and each said rib is connected to a separate part of said flange section.

12. Anchor member assembly, as set forth in claim 1, wherein said ribs are connected to and extend outwardly and axially from said outer peripheral edge, and each said rib is connected to a separate part of said flange section.

13. Anchor member assembly, as set forth in claim 2, wherein said ribs are connected to and extend outwardly and axially from said outer peripheral edge, and each said rib is connected to a separate part of said flange section.

14. Anchor member assembly, as set forth in claim 3, wherein said ribs are connected to and extend outwardly and axially from said outer peripheral edge, and each said rib is connected to a separate part of said flange section.

* * * * *